UNITED STATES PATENT OFFICE.

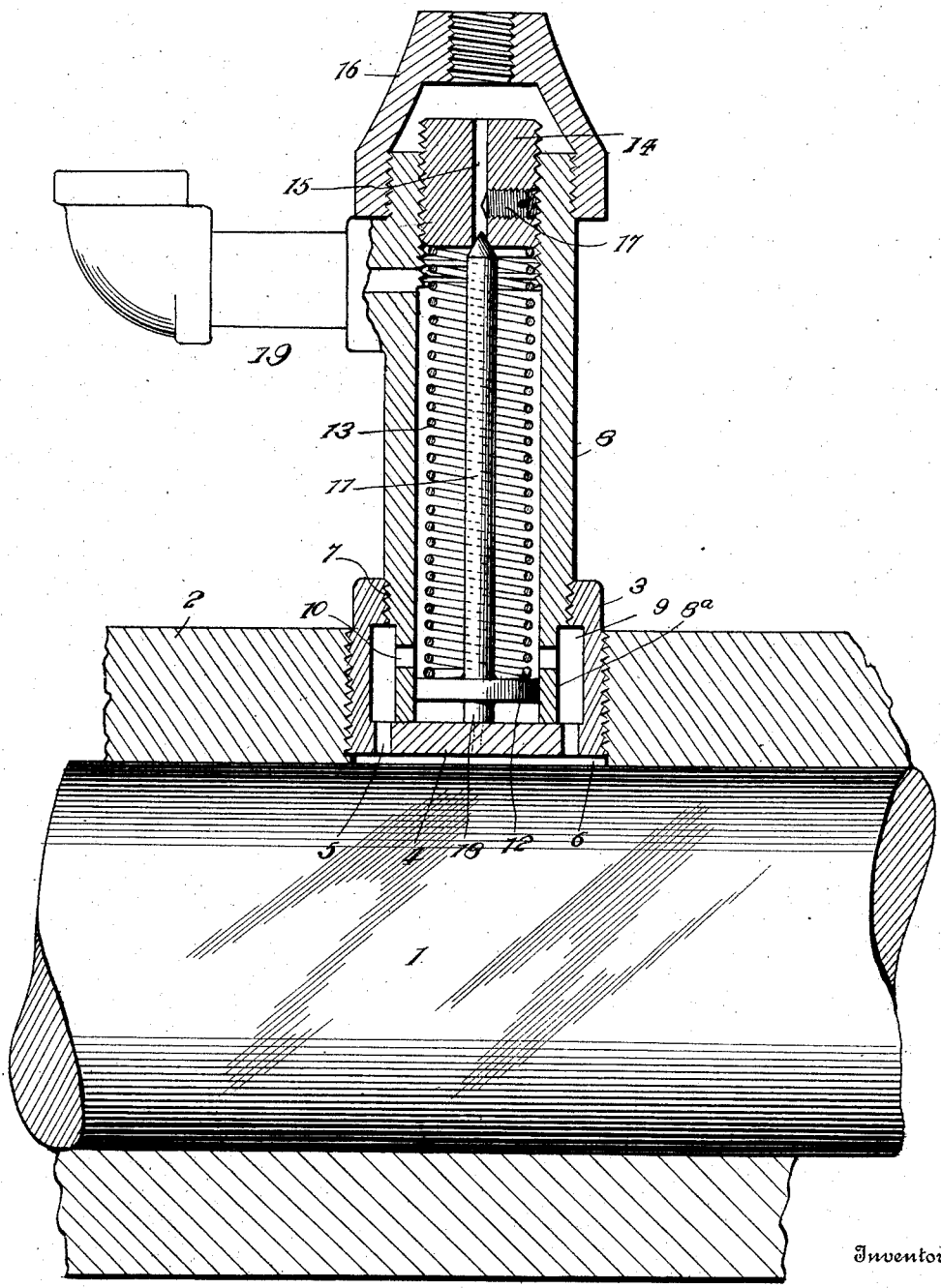

RICHARD T. RICKARDS, OF PHILADELPHIA, PENNSYLVANIA.

EMERGENCY OIL-CUP.

No. 864,991.          Specification of Letters Patent.          Patented Sept. 3, 1907.

Application filed March 28, 1906. Serial No. 308,607.

*To all whom it may concern:*

Be it known that I, RICHARD T. RICKARDS, a citizen of the United States, residing at Philadelphia, in the county of Philadelphia and State of Pennsylvania, have invented certain new and useful Improvements in Emergency Oil-Cups, of which the following is a specification.

My invention contemplates certain new and useful improvements in that class of automatically operating or emergency lubricating devices for journal boxes, shafts or the like in which the supply of oil or lubricating and cooling medium for the shaft for instance, is controlled by a valve normally held seated under ordinary conditions by a plug fusible at a certain or predetermined temperature, so that when said temperature is reached by the shaft or journal becoming hot said plug will melt and allow the valve to open to admit oil or a cooling medium, to the hot part.

The object of the invention is to provide a device of this character which will be composed of comparatively few and simple parts which will be compactly arranged and durable and which will operate effectively to accomplish the desired result.

For a full description of the invention and the merits thereof and also to acquire a knowledge of the details of construction of the means for effecting the result, reference is to be had to the following description and accompanying drawing, in which the figure represents in vertical longitudinal section a shaft bearing and my invention applied thereto.

Referring to the drawing in which the invention is shown applied to a shaft, 1 designates the shaft and 2 the pedestal or bearing therefor. Within one side of the bearing 2 there is mounted a preferably screw threaded bushing 3 which is provided at its inner or lower end with a web or cross plate 4 provided with a series of apertures 5 establishing communication between the interior of the bushing and the space 6 around the shaft 1, said space being preferably provided by screwing the bushing 3 into the bearing 2 until its lower or webbed end 4 projects but is slightly spaced from the shaft.

The bushing 3 is provided at its upper or outer end with an inwardly extending preferably screw threaded annular flange 7 into which a tubular valve casing 8 is screwed.

The casing 8 is provided with an extension 8ª spaced from the inner walls of the bushing 3 and providing an annular chamber 9 which communicates with the interior of the casing by means of lateral ports 10 in the latter.

Within the casing 8 is mounted a valve 11 the stem of which is provided at one end with a tapered or needle like construction which is the valve proper, and to the other end of which is secured or integrally formed a disk 12. A spring 13 encircles the stem of the valve 11 and bears on the upper or outer surface of the disk 12 in a direction to unseat the valve from its seat formed in the lower or under side of a bushing 14 screwed in the outer end of the casing 8, the spring bearing at its outer end on the inner face of said bushing.

The bushing 14 is provided with a passage 15 extending therethrough, the inner end of said passage forming the seat for the valve, and said passage constitutes a duct for the oil or other lubricating or cooling medium.

A cap 16 is connected to the outer end of the casing 8 and surrounds the bushing 14 and is provided with means for the suitable connection thereto of a pipe (not shown) leading from the oil tank or other source of supply.

17 designates a regulating screw or pin which is mounted in the bushing 14 and extends therethrough in an adjustable manner so that its inner end may be projected more or less into the duct 15 and thereby regulate the flow of oil therefrom by decreasing the size of said duct to a greater or less extent.

The valve 11 is normally held to its seat, closing the duct 15 and cutting off the supply of oil by means of the fusible plug 18 which is interposed between the inner face of the disk 12 and the outer face of the web 4. Whenever the shaft becomes dangerously hot, and its temperature rises to the predetermined point, the plug 18 will fuse, and no longer support the disk 12. Hence the spring 13 will act in an inward direction on the disk and unseat the valve, permitting the oil or the like to flow through and from the duct 15 into the interior of the casing 8 and thence through the lateral ports 10 into the chamber 9 and then through the apertures 5 into the space 6 to act upon the shaft 1.

From the foregoing description in connection with the accompanying drawings it will be seen that I have provided an improved emergency or automatically operating oil cap or lubricating device which will act promptly upon a shaft or journal when the same becomes hot to a predetermined degree, thereby avoiding the injurious and dangerous results that ordinarily ensue from such a cause.

As illustrated in the drawings, the valve casing 8 may be provided near its upper end with a lateral inlet pipe 19 designed for connection to the regular oil cup, that is, the oil cup designed to feed oil or the like to the shaft 1 under ordinary or normal conditions. By this means oil may be fed to the shaft through the extension 19 and valve casing 9, and it will only be necessary to have the one opening into the bearing or pedestal the same opening serving for both the ordinary oil cup and the emergency oil cup heretofore described.

Having thus described the invention what is claimed as new is:

1. In a device of the character described, the combination of a valve casing designed for attachment to a source of supply and provided with an oil duct, a spring pressed valve designed to close one end of said duct and provided at its other end with a disk the spring acting to unseat the valve, and a fusible plug designed to support the valve in contact with the end of said duct and against the action of said spring, as and for the purpose set forth.

2. In a device of the character described the combination of a valve casing arranged for connection to a source of supply and provided with a duct, a valve designed to close said duct and provided with a spring tending to unseat it, a fusible plug designed to hold the said valve seated, and means for regulating the size of said duct, as and for the purpose set forth.

3. In a device of the character described the combination of a valve casing arranged for connection to a source of supply, a bushing in one end of said valve casing provided with a duct extending therethrough, a regulating screw mounted in said bushing and designed to be projected to a greater or less extent in the said duct whereby to regulate the passage of fluid therethrough, a spring-pressed valve designed to close said duct, and a fusible plug adapted to support said valve in seated position.

4. A device of the character described comprising a bushing adapted to be screwed in a journal bearing or the like, a valve casing mounted in said bushing the interior of the valve casing communicating with the interior of the bushing and the latter being arranged to communicate with a part to be lubricated, the bushing being provided with a web at its inner side, a valve designed to control the admission of oil and arranged to automatically unseat and a fusible plug interposed between the valve and the web of the bushing and adapted to support the valve in seated position.

5. A device of the character described comprising a bushing designed to be secured to a journal bearing or the like and provided at its inner end with an apertured web, a valve casing secured in said bushing and producing therewith an annular space, said space being in communication with the apertures of the web and with the interior of the valve casing, means for admitting oil to the interior of the valve casing and permitting it to flow therethrough into the said annular space and through the apertures in the web to the part to be lubricated, the said oil admission means including a valve tending to assume an unseated position, and a fusible plug interposed between a portion of the valve and the web and adapted to hold the valve seated.

6. A device of the character described comprising a bushing adapted to be secured to a journal bearing or the like and provided at its inner end with an apertured web, a valve casing mounted in said bushing and provided with lateral ports communicating with the interior of the bushing and with the apertures in the web thereof, a bushing secured in the outer end of the valve casing and provided with an oil duct, a spring-inserted valve one end of which is adapted to seat against one end of said duct, and the other end of said valve being provided with a disk against which the spring of the valve bears to unseat the same, a fusible plug interposed between said disk and the web of the first named bushing and a cap secured to the outer end of the valve casing and arranged for connection to the source of supply.

7. In a device of the character described the combination of a valve casing designed for attachment to a source of supply and provided with an oil duct, a spring pressed valve designed to close said duct and provided with a spring tending to unseat it, and a fusible plug designed to hold the said valve seated, the valve casing being provided between the point at which the valve is adapted to close the oil duct and its end designed to be located adjacent a shaft or the like, with an extension adapted for attachment to the regular oil cup or source of supply, as and for the purpose set forth.

8. In a device of the character described, the combination of a valve-casing designed for attachment to a source of supply and provided with an oil-duct, a spring-pressed valve designed to close one end of said duct, the spring acting to unseat the valve, and a fusible plug designed to support the valve in contact with the end of said duct and against the action of said spring, as and for the purpose set forth.

In testimony whereof I affix my signature in presence of two witnesses.

RICHARD T. RICKARDS. [L. S.]

Witnesses:
 JOSEPH B. LEIGH,
 CHAS. C. FULMER.